United States Patent
Berger et al.

(10) Patent No.: US 7,550,210 B2
(45) Date of Patent: Jun. 23, 2009

(54) PERPENDICULAR MAGNETIC RECORDING MEDIUM WITH MULTIPLE EXCHANGE-COUPLED MAGNETIC LAYERS HAVING SUBSTANTIALLY SIMILAR ANISOTROPY FIELDS

(75) Inventors: Andreas Klaus Berger, San Jose, CA (US); Hoa Van Do, Fremont, CA (US); Eric E. Fullerton, Morgan Hill, CA (US); Yoshihiro Ikeda, San Jose, CA (US); Byron Hassberg Lengsfield, III, Gilroy, CA (US); Natacha F. Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 555 days.

(21) Appl. No.: 11/372,295

(22) Filed: Mar. 9, 2006

(65) Prior Publication Data

US 2007/0212574 A1 Sep. 13, 2007

(51) Int. Cl.
G11B 5/66 (2006.01)
(52) U.S. Cl. ............... 428/828; 428/828.1; 360/125.02; 360/135
(58) Field of Classification Search ........................ None
See application file for complete search history.

(56) References Cited

U.S. PATENT DOCUMENTS

| | | | |
|---|---|---|---|
| 6,007,924 A | 12/1999 | Lal et al. | |
| 2003/0096127 A1 | 5/2003 | Hikosaka et al. | |
| 2006/0177703 A1* | 8/2006 | Takenoiri et al. | ............ 428/829 |
| 2006/0204791 A1* | 9/2006 | Sakawaki et al. | ........ 428/828.1 |

OTHER PUBLICATIONS

Derwent Abstract Translation of WO 2004/090874 A1 (Derwent Acc-No. 2004-758135).*
Derwent Abstract Translation of jP 2006-048900 A (Derwent Acc-No. 2006-168815).*
Benakli et al., "Micromagnetic Study of Switching Speed in Perpendicular Recording Media", IEEE Trans. MAG 37(4), 1564 (2001).
Gao et al., "Transition Jitter Estimates in Tilted and Conventional Perpendicular Recording Media at 1 Tb/in2", IEEE Trans. MAG 39(2), 704 (2003).

(Continued)

Primary Examiner—Kevin M. Bernatz
(74) Attorney, Agent, or Firm—Thomas R. Berthold

(57) ABSTRACT

A perpendicular magnetic recording medium has an "exchange-spring" type magnetic recording layer (RL) formed of two ferromagnetic layers with substantially similar anisotropy fields that are ferromagnetically exchange-coupled by a nonmagnetic or weakly ferromagnetic coupling layer. Because the write head produces a larger magnetic field and larger field gradient at the upper portion of the RL, while the field strength decreases further inside the RL, the upper ferromagnetic layer can have a high anisotropy field. The high field and field gradient near the top of the RL, where the upper ferromagnetic layer is located, reverses the magnetization of the upper ferromagnetic layer, which then assists in the magnetization reversal of the lower ferromagnetic layer. Because both ferromagnetic layers in this exchange-spring type RL have a high anisotropy field, the thermal stability of the medium is not compromised. The medium shows improved writability, i.e., a low switching field, as well as lower intrinsic media noise, over a medium with a conventional single-layer RL.

16 Claims, 5 Drawing Sheets

OTHER PUBLICATIONS

Victoria et al., "Composite Media for Perpendicular Magnetic Recording", IEEE Trans. MAG 41 (2), 537-542, Feb. 2005.

Wang et al., "Composite media (dynamic tilted media) for magnetic recording", Appl. Phys. Lett. 86 (14) Art. No. 142504, Apr. 1, 2005.

Girt et al., "Antiferromagnetically Coupled Perpendicular Recording Media", IEEE Trans. on Magnetics, vol. 39, No. 5, Sep. 2003, pp. 2306-2310.

* cited by examiner

PERPENDICULAR MAGNETIC RECORDING MEDIUM WITH MULTIPLE EXCHANGE-COUPLED MAGNETIC LAYERS HAVING SUBSTANTIALLY SIMILAR ANISOTROPY FIELDS

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Perpendicular magnetic recording, wherein the recorded bits are stored in the generally planar recording layer in a generally perpendicular or out-of-plane orientation (i.e., other than parallel to the surfaces of the disk substrate and the recording layer), is a promising path toward ultra-high recording densities in magnetic recording hard disk drives. A common type of perpendicular magnetic recording system is one that uses a "dual-layer" medium. This type of system is shown in FIG. 1 with a single write pole type of recording head. The dual-layer medium includes a perpendicular magnetic data recording layer (RL) on a "soft" or relatively low-coercivity magnetically permeable underlayer (SUL) formed on the substrate.

One type of material for the RL is a granular ferromagnetic cobalt alloy, such as a CoPtCr alloy, with a hexagonal-close-packed (hcp) crystalline structure having the c-axis oriented generally perpendicular or to the RL. The granular cobalt alloy RL should also have a well-isolated fine-grain structure to produce a high-coercivity media and to reduce intergranular exchange coupling, which is responsible for high intrinsic media noise. Enhancement of grain segregation in the cobalt alloy RL can be achieved by the addition of oxides, including oxides of Si, Ta, Ti, Nb, Cr, V, and B. These oxides tend to precipitate to the grain boundaries, and together with the elements of the cobalt alloy form nonmagnetic intergranular material.

The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field H acting on the recording layer RL. The disk also includes the hard disk substrate that provides a generally planar surface for the subsequently deposited layers. The generally planar layers formed on the surface of the substrate also include a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and a secondary write pole (SWP) beneath the RL. The SWP is facilitated by the SUL, which is decoupled from the RL by the EBL and produces a magnetic mirror image of the RWH during the write process. This effectively brings the RL into the gap of the ARH and allows for a large write field H inside the RL. However, this geometry also results in the write field H inside the RL being oriented nearly normal to the surface of the substrate and the surface of the RL, i.e., along the perpendicular easy axis of the RL grains, as shown by typical grain 1 with easy axis 2. The nearly parallel alignment of the write field H and the RL easy axis has the disadvantage that relatively high write fields are necessary to reverse the magnetization because minimal torque is exerted onto the grain magnetization. Also, a write-field/easy-axis alignment increases the magnetization reversal time of the RL grains, as described by M. Benakli et al., *IEEE Trans. MAG* 37, 1564 (2001).

For these reasons, "tilted" media have been theoretically proposed, as described by K.-Z. Gao et al., *IEEE Trans. MAG* 39, 704 (2003), in which the magnetic easy axis of the RL is tilted at an angle of about 45 degrees with respect to the surface normal, so that magnetization reversal can be accomplished with a lower write field and without an increase in the reversal time. While there is no known fabrication process to make high-quality recording media with a tilted easy axis, there have been proposals to achieve a magnetic behavior that emulates tilted media using a media structure compatible with conventional media fabrication techniques. In one technique, the perpendicular recording medium is a composite medium of two ferromagnetically exchange-coupled magnetic layers with substantially different anisotropy fields ($H_k$). (The anisotropy field $H_k$ of a ferromagnetic layer with uniaxial magnetic anisotropy $K_u$ is the magnetic field that would need to be applied along the easy axis to switch the magnetization direction.) Magnetic simulation of this composite medium shows that in the presence of a uniform write field H the magnetization of the lower-$H_k$ layer will rotate first and assist in the reversal of the magnetization of the higher-$H_k$ layer. This behavior, sometimes called the "exchange-spring" behavior, and various types of composite media are described by R. H. Victora et al., "Composite Media for Perpendicular Magnetic Recording", *IEEE Trans MAG* 41 (2), 537-542, February 2005; and J. P. Wang et al., "Composite media (dynamic tilted media) for magnetic recording", *Appl. Phys. Lett.* 86 (14) Art. No. 142504, Apr. 4, 2005. Pending application Ser. No. 11/231,516, filed Sep. 21, 2005 and assigned to the same assignee as this application, describes a perpendicular magnetic recording medium with an exchange-spring structure.

As the thickness of the RL decreases, the magnetic grains become more susceptible to magnetic decay, i.e., magnetized regions spontaneously lose their magnetization, resulting in loss of data. This is attributed to thermal activation of small magnetic grains (the superparamagnetic effect). The thermal stability of a magnetic grain is to a large extent determined by $K_u V$, where $K_u$ is the magnetic anisotropy constant of the layer and V is the volume of the magnetic grain. Thus a RL with a high $K_u$ is important for thermal stability. However, in exchange-spring composite media one of the magnetic layers has very low $K_u$, so that this layer can not contribute to the thermal stability of the RL.

What is needed is a perpendicular magnetic recording medium that displays a magnetization reversal behavior similar to tilted media and is compatible with conventional fabrication processes, without sacrificing thermal stability.

SUMMARY OF THE INVENTION

The invention is a perpendicular magnetic recording medium having an "exchange-spring" type magnetic recording layer (RL). The RL is formed of two ferromagnetic layers with substantially similar anisotropy fields that are ferromagnetically exchange-coupled by a nonmagnetic or weakly ferromagnetic coupling layer. Because the write head produces a larger magnetic field and larger field gradient at the upper portion of the RL, while the field strength decreases further inside the RL, the upper ferromagnetic layer can have a high anisotropy field. The high field and field gradient near the top of the RL, where the upper ferromagnetic layer is located, reverses the magnetization of the upper ferromagnetic layer, which then assists in the magnetization reversal of the lower ferromagnetic layer. Because both ferromagnetic layers in this exchange-spring type RL have a high anisotropy field and are sufficiently exchange coupled, the thermal stability of the medium is not compromised. The medium shows improved writability, i.e., an improved magnetization reversal response to the write field of a recording head, as well as lower intrinsic media noise, over a medium with a conventional single-layer RL.

For a fuller understanding of the nature and advantages of the present invention, reference should be made to the following detailed description taken together with the accompanying figures.

DETAILED DESCRIPTION OF THE INVENTION

Figure 1:
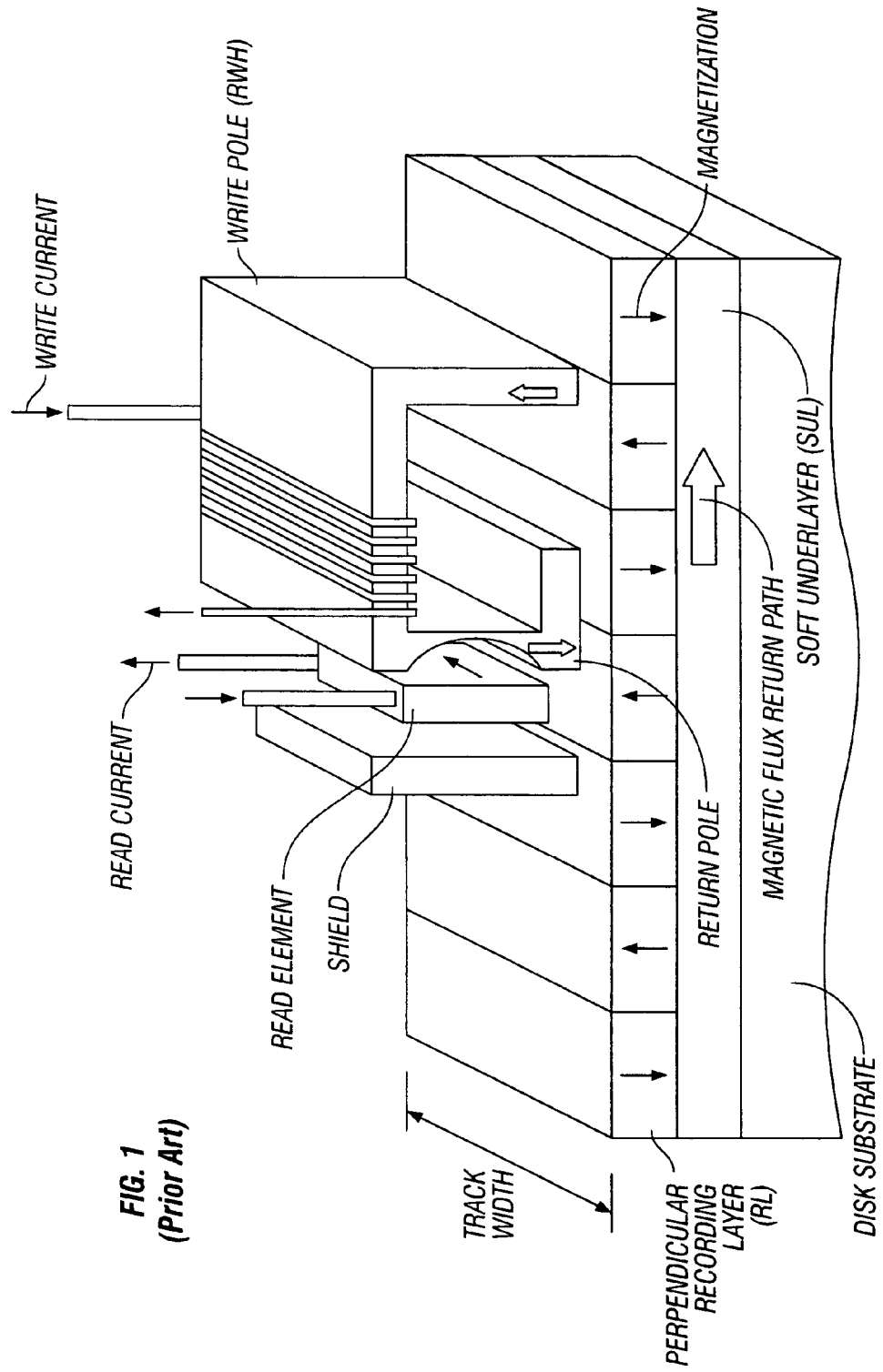
FIG. 1 is a schematic of a prior art perpendicular magnetic recording system.
Figure 2:
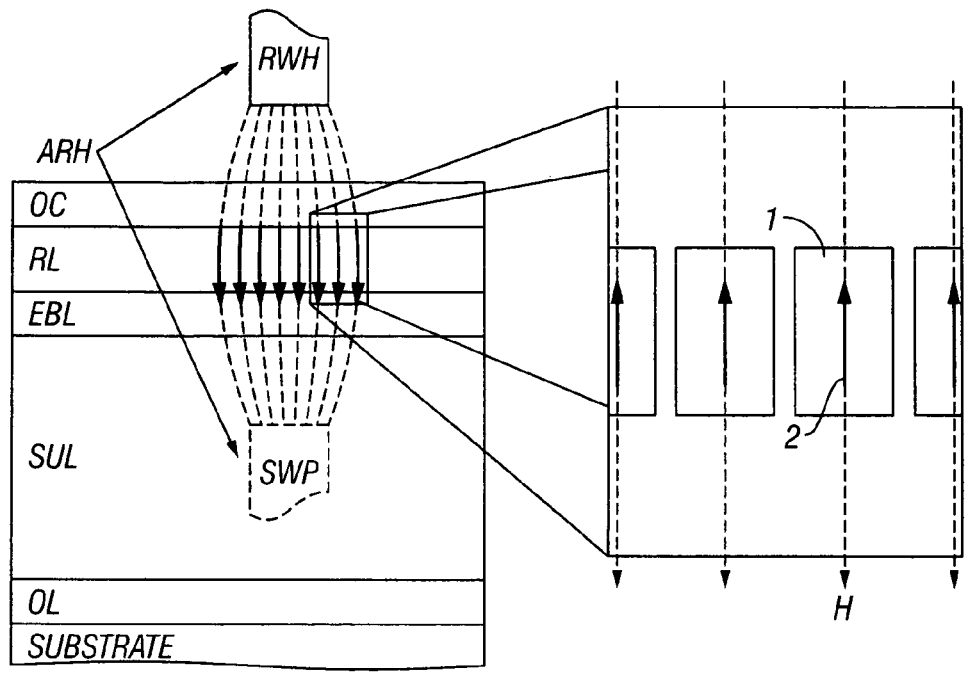
FIG. 2 is a schematic of a cross-section of a prior art perpendicular magnetic recording disk showing the write field H acting on the recording layer (RL).
Figure 3:
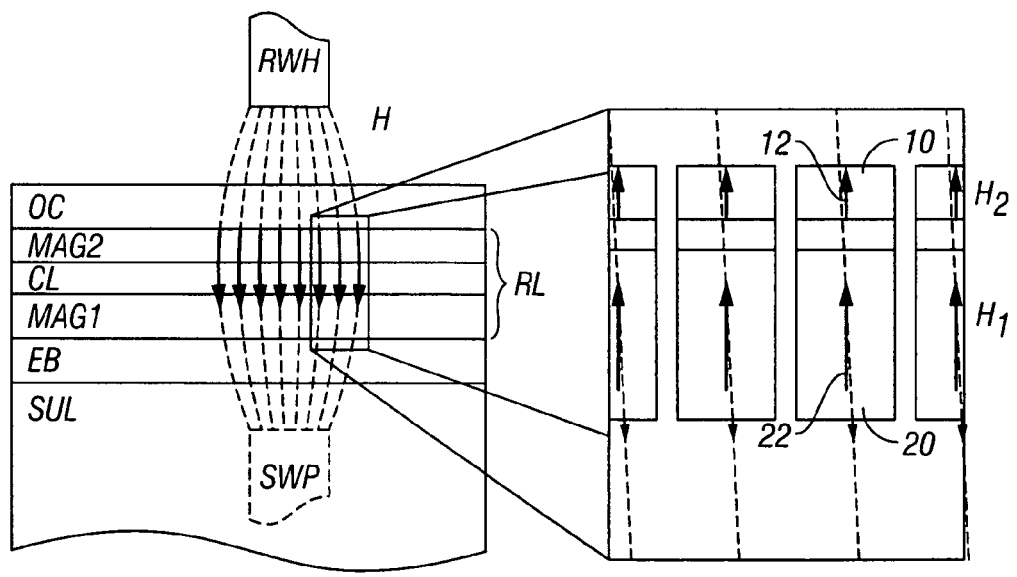
FIG. 3 is a schematic of a cross-section of the perpendicular magnetic recording disk according to the invention showing the recording layer (RL) made up of two magnetic layers (MAG1 and MAG2) separated by a ferromagnetic coupling layer (CL), and the fields H1 and H2 acting on MAG1 and MAG2, respectively.

The invention is a perpendicular magnetic recording medium, shown in sectional view in FIG. 3, with a multilayer RL comprising at least two ferromagnetically exchange-coupled magnetic layers (MAG1 and MAG2), each with generally perpendicular magnetic anisotropy, and with substantially similar anisotropy fields $H_k$. Adjacent magnetic layers are separated by a ferromagnetic coupling layer (CL) that provides the appropriate ferromagnetic coupling strength between the magnetic layers. The multilayer RL structure takes advantage of the depth-dependent write field H, i.e., in general a write head produces a larger magnetic field and larger field gradient near the surface of the RL, while the field strength decreases further inside the RL. The high field and field gradient near the top of the RL, where MAG2 is located, enables MAG2 to be formed of a high-$H_k$ material. As the magnetization of MAG2 is reversed by the write field it assists in the magnetization reversal of the lower magnetic layer MAG1. In this non-coherent reversal of the magnetizations of MAG1 and MAG2, MAG2 changes its magnetization orientation in response to a write field and in turn amplifies the "torque," or reverse field, exerted on MAG1, causing MAG1 to change its magnetization direction in response to a weaker write field than would otherwise be required in the absence of MAG2. Although the write field acting on MAG1 can be significantly less than the write field acting on MAG2, MAG1 can have substantially the same $H_k$ because of the torque created by the magnetization reversal of MAG2. MAG1 and MAG2 can thus have substantially the same material composition and thus substantially similar anisotropy fields Hk.

The medium in the form of a disk is shown in sectional view in FIG. 3 with the write field H. As shown in the expanded portion of FIG. 3, a typical grain 10 in MAG2 has a generally perpendicular or out-of-plane magnetization along an easy axis 12, and is acted upon by a write field H2. A typical grain 20 in MAG1 below the MAG2 grain 10 also has a perpendicular magnetization along an easy axis 22, and is acted upon by a write field H1 less than H2. In the presence of the applied write field H2, the MAG2 acts as a write assist layer by exerting a magnetic torque onto MAG1 that assists in reversing the magnetization of MAG1.

Figure 4:
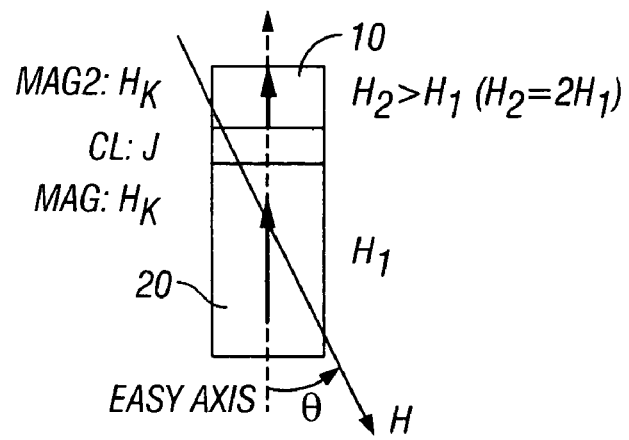
FIG. 4 is a schematic of a magnetic model of the magnetic grains of MAG1 and MAG2 with their easy axes of magnetization acted upon by the fields H1 and H2, respectively.

The advantage of the medium of this invention has been estimated by magnetic modeling calculations. In the model, schematically displayed in FIG. 4, the MAG2 and MAG1 grains 10, 20 are modeled as two coupled Stoner-Wohlfarth particles, each having uniaxial substantially perpendicular magnetic anisotropy. Uniaxial magnetic anisotropy of a ferromagnetic layer with an anisotropy constant $K_u$ means essentially that all of the magnetic moments tend to align along the same axis, referred to as the easy axis, which is the lowest energy state. The anisotropy field $H_k$ of a ferromagnetic layer with uniaxial magnetic anisotropy $K_u$ is the magnetic field that would need to be applied along the easy axis to switch the magnetization direction. The grains are coupled by the coupling layer (CL) that mediates a ferromagnetic coupling of strength J. In this model it is assumed that the write head-generated field is applied at an angle θ, which is identical for both MAG1 and MAG2 layers, but is stronger in the upper layer MAG2 than in MAG1, i.e. H2>H1. For the numerical simulations it was assumed that H2=2H1, but any field relation H2>H1 will show fundamentally the same effects. For magnetic layer thicknesses and write heads in future perpendicular magnetic recording systems, the field applied at the upper magnetic layer may be substantially greater, e.g., 40% greater, than the field applied at the lower magnetic layer.

Figure 5:
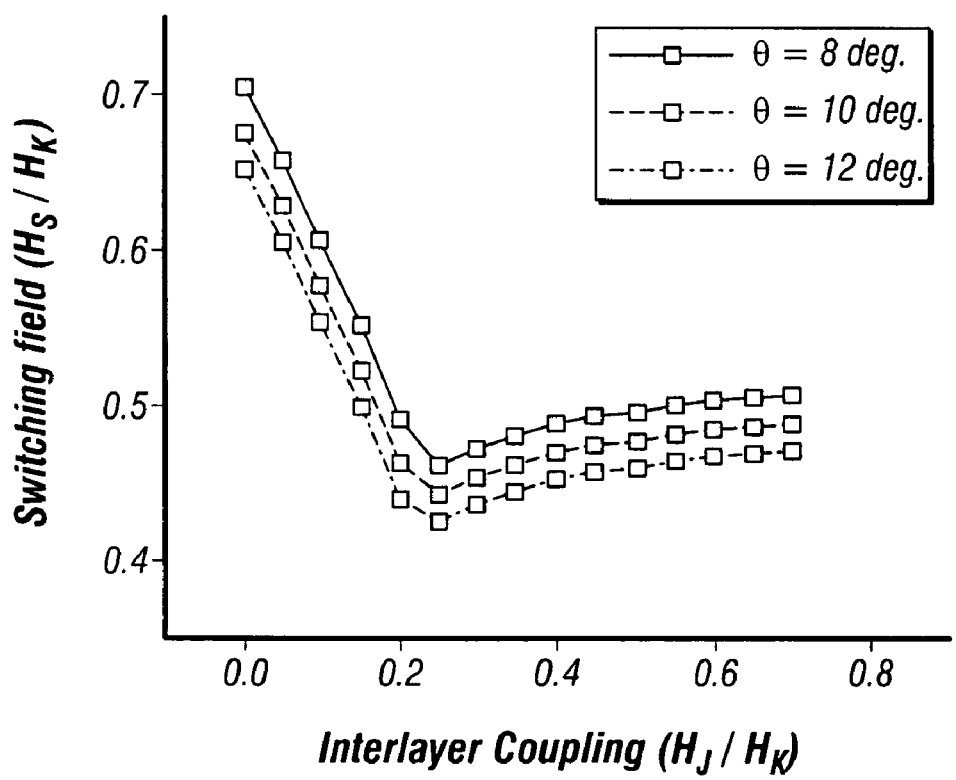
FIG. 5 is a graph of calculated switching field $H_S$ in units of $H_k$ as a function of the interlayer coupling strength $H_J$ in units of $H_k$ for various values of applied magnetic field angle θ for the case H2=2 H1 and θ1=θ2=θ.

FIG. 5 shows a plot of the switching field $H_s$ as a function of the interlayer coupling strength $H_J$, given in units of $H_k$, for three different values of the applied magnetic field angle θ. For each value of θ a minimum of $H_s$ occurs at an intermediate value of $H_J$. Thus the required switching field is clearly less than would be required if MAG1 and MAG2 were strongly coupled, i.e., large values $H_J$. Thus, the RL with "weakly" coupled MAG1 and MAG2 enables substantially non-coherent reversal in a non-uniform applied write field and thereby reduces the required switching field.

Figure 6:
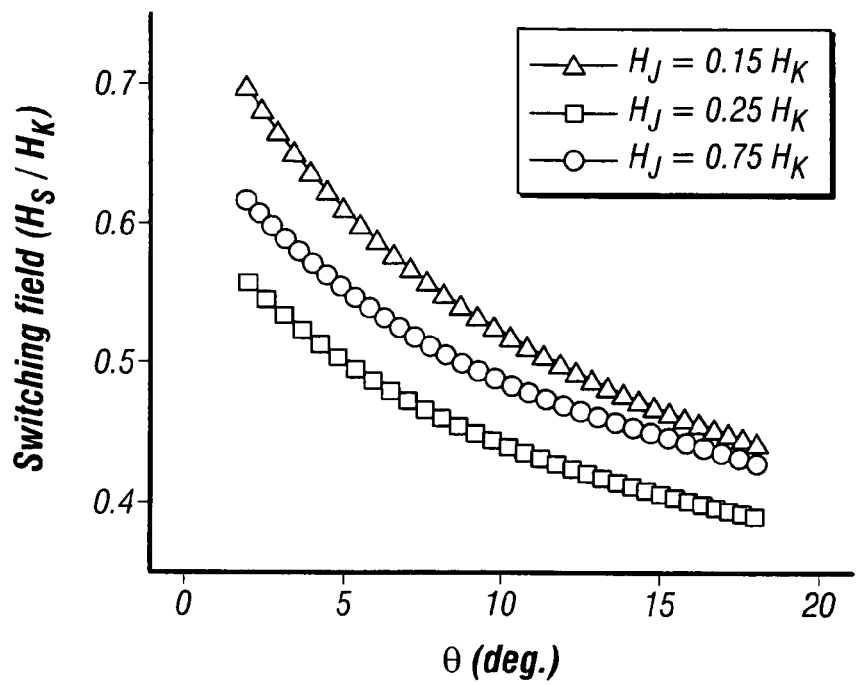
FIG. 6 is a graph of switching field $H_S$ in units of $H_k$ as a function of the applied field angle θ for three different values of the interlayer coupling strength $H_J$.

FIG. 6 shows the switching field $H_S$ as a function of the applied field angle θ for three different values of the interlayer coupling strength $H_J$. The optimized coupling case, $H_J = 0.25\ H_k$, exhibits both the lowest overall switching field $H_S$ and the least amount of field angle dependence. The low field angle dependence is important because it is not possible to manufacture a RL in which the grain orientation is a constant value at all locations in the RL and thus the grains exhibit a grain orientation distribution that contributes to the switching field distribution.

Figure 7:
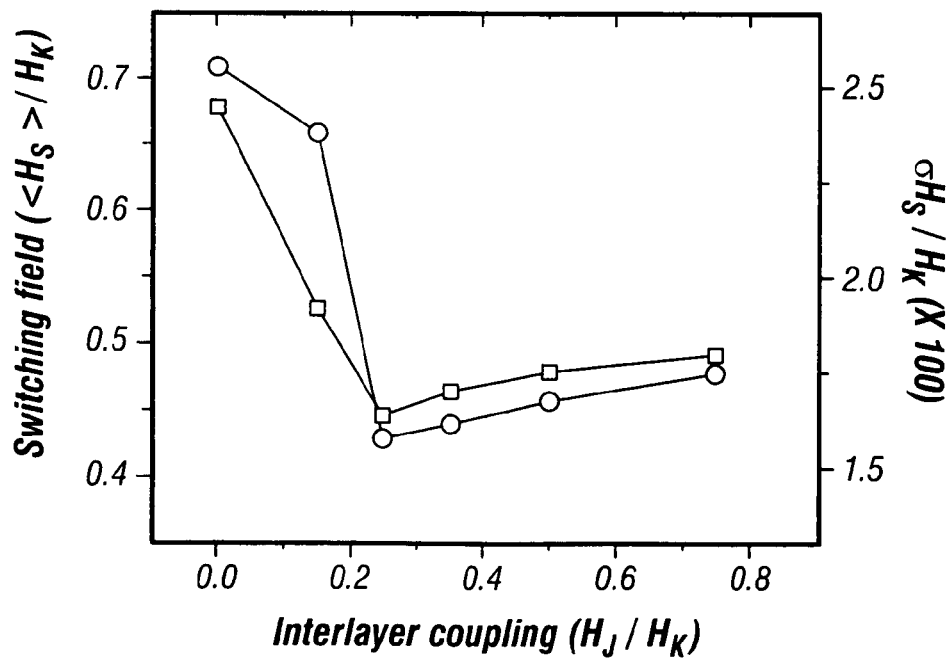
FIG. 7 is a graph of averaged switching field <$H_S$> and the switching field distribution width σ$H_S$ in units of $H_k$ as a function of the interlayer coupling strength $H_J$, calculated for a media grain assembly, which has an orientation distribution with a standard deviation of 2 degrees, mean write field angle assumed to be <θ>=10 deg., and H2=2 H1.

The reduced angular dependence of $H_S$ for the optimized case results in a reduced switching field distribution width, in addition to the overall reduced average switching field $<H_S>$. This is shown in FIG. 7, which is a graph of averaged switching field $<H_S>$ and the switching field distribution width $\sigma H_S$ in units of $H_k$ as a function of the interlayer coupling strength $H_J$, calculated for a media grain assembly which has an orientation distribution with a standard deviation of 2 degrees. The open squares show the calculated values for $<H_S>$ and correspond to the left hand axis, while the $\sigma H_S$—data are shown as open circles and correspond to the right hand axis, as indicated by the arrows. Both the averaged switching field $<H_S>$ and the switching field distribution width $\sigma H_S$ exhibit a minimum at the same, and therefore optimized, interlayer coupling strength $H_J = 0.25\ H_k$. Thus, the medium of this invention is expected to not only show improved writability (low switching field $H_S$) but also lower intrinsic media noise, since it is known that a large switching field distribution is a significant contributor to media jitter. Media jitter is the average error of not having the recorded transitions precisely located and is given by the standard deviation of the zero crossings of the readback voltage measured as a length, e.g., in nanometers. A high jitter value is associated with low media SNR.

Micromagnetic calculations of the recording process, using a realistic 3-dimensional head field model as well as a realistic read-back model were performed for a specific medium structure with a 12 nm thick MAG2 layer and a 4 nm thick MAG1 layer, each having $H_k = 14$ kOe. The performance for a structure with a CL having $H_J = 0.3\ H_k$ was compared to a structure with a CL having $H_J = 1.8\ H_k$. The structure with the weaker ferromagnetic coupling exhibited a media jitter of 1.68 nm, which represents a 16.5% reduction from the 2.02 nm value for the structure with strong coupling.

Figure 8:
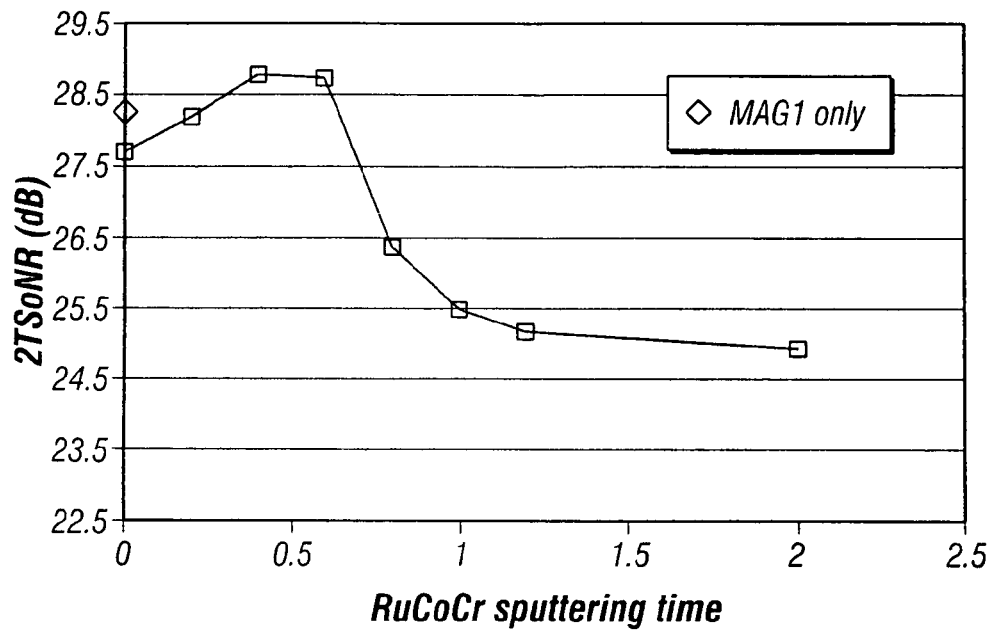
FIG. 8 is a graph of signal-to-noise ratio (SNR) in units of 2TS$_0$NR as a function of ferromagnetic coupling layer (CL) thickness (in units of CL sputtering time) for an experimental medium having two magnetic layers (MAG1 and MAG2) each formed of $Co_{57}Pt_{18}Cr_{17}(SiO_2)_8$ and separated by a RuCoCr CL.
Figure 9:
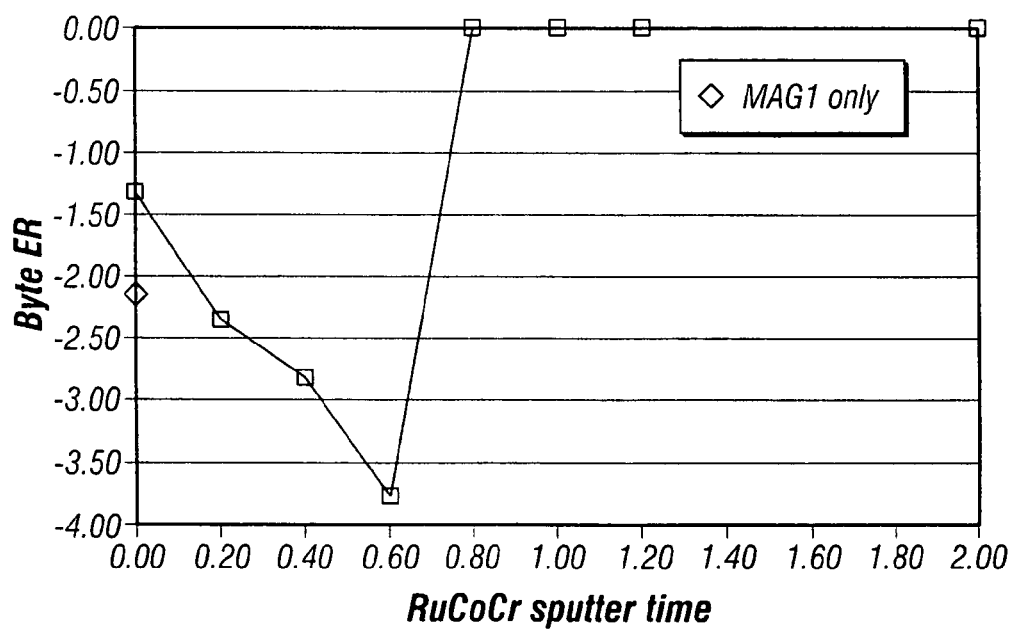
FIG. 9 is a graph of the logarithmic byte error rate as a function of ferromagnetic coupling layer (CL) thickness (in units of CL sputtering time) for an experimental medium having two magnetic layers (MAG1 and MAG2) each formed of $Co_{57}Pt_{18}Cr_{17}(SiO_2)_8$ and separated by a RuCoCr CL.

FIG. 8 is a graph of signal-to-noise ratio (SNR) in units of $2TS_0NR$ as a function of CL thickness (in units of CL sputtering time—1 sec sputter time corresponding approximately to 1 nm CL thickness) for an experimental medium. $2TS_0NR$ is the ratio of the low-frequency signal to the media noise at half the target density (which was 875 kbpi for these measurements). FIG. 9 is a graph of the byte error rate (logarithmic) as a function of CL thickness (in units of CL sputtering time) for the same experimental medium. The RL for this experimental medium had MAG1 and MAG2 each formed of $Co_{57}Pt_{18}Cr_{17}(SiO_2)_8$, which corresponds to anisotropy field $H_k$ of approximately 13 kOe. The CL was nonmagnetic $Ru_{50}Co_{30}Cr_{20}$ that contained enough Co to mediate sufficient ferromagnetic exchange coupling in a 0.4-0.7 nm thickness range. MAG1 had a thickness of 13 nm and MAG2 had a thickness of 3 nm. In both graphs there is also a comparison of the value of SNR and byte error rate, respectively, for a conventional perpendicular medium, i.e., with a RL of just MAG1. In FIG. 8, the SNR for a medium with a CL thickness of about 0.6 nm is about 28.7 dB, as compared to about 28.1 dB for the conventional MAG1-only medium. In FIG. 9, the byte error rate for a medium with a CL thickness of about 0.6 nm is about $10^{-3.8}$, as compared to about $10^{-2.1}$ for the conventional MAG1-only medium.

By varying the CL thickness, it is possible to tune the exchange coupling between MAG1 and MAG2, with zero CL thickness corresponding to the strong coupling case and large CL thickness corresponding to vanishing coupling strength. Furthermore, the RL with optimized ferromagnetic coupling of MAG1 and MAG2 exhibits improved write-width characteristics relative to conventional exchange-spring designs, which employ soft magnetic layers.

A representative disk structure for the invention shown in FIG. 3 will now be described. The hard disk substrate may be any commercially available glass substrate, but may also be a conventional aluminum alloy with a NiP surface coating, or an alternative substrate, such as silicon, canasite or silicon-carbide.

The adhesion layer or OL for the growth of the SUL may be an AlTi alloy or a similar material with a thickness of about 2-5 nm. The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof.

The EBL is located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer may be used on top of the SUL before deposition of the EBL. For example, if Ru is used as the EBL, a 2-4 nm thick NiFe or NiW seed layer may be deposited on top of the SUL, followed by a 5-20 nm thick Ru EBL.

The MAG1 and MAG2 layers may be formed of any of the known amorphous or crystalline materials and structures that exhibit perpendicular magnetic anisotropy. Thus, the MAG1 and MAG2 may each be a layer of granular polycrystalline cobalt alloy, such as a CoPt or CoPtCr alloy, with or without an oxide, such as oxides of Si, Ta, Ti, Nb, Cr, V and B. Also, MAG1 and MAG2 may each be composed of multilayers with perpendicular magnetic anisotropy, such as Co/Pt, Co/Pd, Fe/Pt and Fe/Pd multilayers. In addition, perpendicular magnetic layers containing rare earth elements are useable for MAG1 and MAG2, such as CoSm, TbFe, TbFeCo, GdFe alloys. MAG1 and MAG2 have substantially the same anisotropy field $H_k$, meaning that the $H_k$ value for the layer with the lower $H_k$ is at least 70% (and up to at least 90%) of the $H_k$ value for the layer with the higher $H_k$. This can be achieved by forming MAG1 and MAG2 of substantially the same materials and composition, which simplifies the fabrication process. In the preferred implementation the upper layer (MAG2) has a thickness less than or equal to the thickness of the lower layer (MAG1).

Because the CL is below MAG2, it should be able to sustain the growth of MAG2, while mediating a weak ferromagnetic coupling between the MAG2 and MAG1. Hexagonal-close-packed (hcp) materials for instance, which can mediate a weak ferromagnetic coupling and provide a good template for the growth of MAG2, are good candidates. Because the CL must enable an appropriate coupling strength, it should be either nonmagnetic or weakly ferromagnetic. Thus the CL may be formed of RuCo and RuCoCr alloys with low Co content (<about 60 atomic percent), or CoCr and CoCrB alloys with high Cr and/or B content (Cr+B>about 30 atomic percent). Si-oxide or other oxides like oxides of Ta, Ti, Nb, Cr, V and B may be added to these alloys. The CL may also be formed of face-centered-cubic (fcc) materials, such as Pt or Pd or alloys based on Pt or Pd, because these materials enable a ferromagnetic coupling between magnetic layers of tunable strength (i.e., they reduce the coupling by increasing the thickness) and are compatible with media growth, even though they are.

Depending on the choice of material for CL, and more particularly on the concentration of cobalt (Co) in the CL, the CL may have a thickness of less than 2.0 nm, and more preferably between about 0.2 nm and 1.5 nm. Because Co is highly magnetic, a higher concentration of Co in the CL may be offset by thickening the CL to achieve an optimal inter-layer exchange coupling between MAG1 and MAG2. The inter-layer exchange coupling between MAG1 and MAG2 may be optimized, in part, by adjusting the materials and thickness of the CL. The CL should provide a coupling strength sufficient to have a considerable effect on the switching field (and the switching field distribution), but small enough to not couple the MAG1 and MAG2 layers rigidly together.

The OC formed on top of the RL may be an amorphous "diamond-like" carbon film or other known protective over-coats, such as Si-nitride.

While the invention has been shown and described with an RL having only two magnetic layers and one CL, the RL may have three or more magnetic layers, with additional CLs as required to mediate weak exchange coupling between adjacent magnetic layers. The additional magnetic layers would also have anisotropy fields substantially similar to the anisotropy fields of MAG1 and MAG2.

The medium of this invention is substantially different from well-known "laminated" media, which may also have two or more magnetic recording layers of similar high-$H_k$ material. In laminated media, as described for example in U.S. Pat. No. 6,007,924, no substantial coupling between the magnetic layers is present because the functionality of the media is based on the independence of the two recording layers. The recording properties of laminated media are superior to single-layer media only if the recorded magnetization patterns in the two layers are not fully correlated. Also, in laminated media each recording layer has to be independently stable against thermal fluctuations. This is not a requirement with the present invention because MAG2 can be substantially thinner than MAG1. Also, MAG2 is not envisioned to be magnetically stable by itself without coupling to MAG1, i.e., MAG2 is intended to be a superparamagnetic layer. Both MAG1 and MAG2 could be superparamagnetic layers that are only stable due to their ferromagnetic coupling across CL.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
   a substrate;
   a first ferromagnetic layer on the substrate and having an out-of-plane easy axis of magnetization;
   a second ferromagnetic layer having an out-of-plane easy axis of magnetization, the first and second layers having the same composition and same anisotropy fields; and
   a coupling layer between the first layer and the second layer and permitting ferromagnetic coupling of the first layer with the second layer, wherein the interlayer coupling strength, $H_j$, between said first and second ferromagnetic layers satisfies the relationship $H_j \approx 0.25\, H_k$, where $H_k$ is the anisotropy field of said first and second ferromagnetic layers.

2. The medium of claim 1 wherein the first layer is between the substrate and the coupling layer and wherein the thickness of the first layer is at least as thick as the second layer.

3. The medium of claim 1 wherein the substrate has a generally planar surface and the first layer is on the substrate surface, and wherein each of the first and second layers is a hexagonal-close-packed material with its c-axis oriented generally perpendicular to the substrate surface and the coupling layer is a hexagonal-close-packed material with its c-axis oriented generally perpendicular to the substrate surface.

4. The medium of claim 1 wherein the coupling layer is formed of a material selected from the group consisting of (a) a RuCo alloy with Co less than about 60 atomic percent, (b) a RuCoCr alloy with Co less than about 60 atomic percent, and (c) an alloy of Co and one or more of Cr and B with the combined content of Cr and B greater than about 30 atomic percent.

5. The medium of claim 4 wherein the coupling layer further comprises one or more oxides of one or more elements selected from the group consisting of Si, Ta, Ti, Nb, Cr, V and B.

6. The medium of claim 1 wherein the coupling layer comprises a material selected from the group consisting of Pt, Pd, Pt-based alloys, and Pd-based alloys.

7. The medium of 1 further comprising an underlayer of magnetically permeable material on the substrate and an exchange break layer between the underlayer and the first layer for preventing magnetic exchange coupling between the underlayer and the first layer.

8. The medium of claim 1 wherein each of the first and second layers is a granular polycrystalline cobalt alloy.

9. The medium of claim 8 wherein each of the first and second layers further comprises an oxide of one or more of Si, Ta, Ti, Nb, Cr, V and B.

10. The medium of claim 1 wherein each of the first and second layers is a multilayer selected from the group consisting of Co/Pt, Co/Pd, Fe/Pt and Fe/Pd multilayers.

11. The medium of claim 1 wherein the coupling layer is a first coupling layer and further comprising a third ferromagnetic layer having an anisotropy field the same as the anisotropy field of the first ferromagnetic layer and a second coupling layer between the second layer and the third layer permitting ferromagnetic coupling of the third layer with the second layer.

12. A perpendicular magnetic recording disk comprising:
   a substrate having a generally planar surface;

an underlayer of magnetically permeable material on the substrate surface;

a first ferromagnetic layer of granular polycrystalline cobalt-platinum alloy on the underlayer and having an out-of-plane easy axis of magnetization;

a second ferromagnetic layer of granular polycrystalline cobalt-platinum alloy having an out-of plane easy axis of magnetization, the first and second layers having the same alloy composition and anisotropy fields; and a coupling layer between the first layer and the second layer and permitting ferromagnetic coupling of the first layer with the second layer; wherein the first layer is between the substrate and the coupling layer and is thicker than the second layer, wherein the interlayer coupling strength, $H_j$, between said first and second ferromagnetic layers satisfies the relationship $H_j \approx 0.25\, H_k$, where $H_k$ is the anisotropy field of said first and second ferromagnetic layers.

13. The disk of claim 12 wherein the coupling layer is formed of a material selected from the group consisting of (a) a RuCo alloy with Co less than about 60 atomic percent, (b) a RuCoCr alloy with Co less than about 60 atomic percent, and (c) an alloy of Co and one or more of Cr and B with the combined content of Cr and B greater than about 30 atomic percent, (d) Pt, (e) Pd, (f) Pt-based alloys, and (g) Pd-based alloys.

14. The disk of claim 12 further comprising an exchange break layer between the underlayer and the first layer for preventing magnetic exchange coupling between the underlayer and the first layer.

15. The disk of claim 12 wherein each of the first and second layers further comprises an oxide of one or more of Si, Ta, Ti, Nb, Cr, V and B.

16. A perpendicular magnetic recording system comprising:

a perpendicular magnetic recording disk comprising:

a substrate having a generally planar surface;

an underlayer of magnetically permeable material on the substrate surface;

a first ferromagnetic layer of granular polycrystalline cobalt alloy on the underlayer and having an out-of-plane easy axis of magnetization;

a second ferromagnetic layer of granular polycrystalline cobalt alloy having an out-of-plane easy axis of magnetization, the first ferromagnetic layer having an anisotropy field and composition the same as the second ferromagnetic layer; and a coupling layer between the first layer and the second layer and permitting ferromagnetic coupling of the first layer with the second layer, the first ferromagnetic layer being located between the underlayer and the coupling layer, wherein the interlayer coupling strength, $H_j$, between said first and second ferromagnetic layers satisfies the relationship $H_j \approx 0.25\, H_k$, where $H_k$ is the isotropy field of said first and second ferromagnetic layers;

a write head for magnetizing regions in the ferromagnetically coupled first and second ferromagnetic layers of said disk, the write head simultaneously applying a magnetic field H2 to the second ferromagnetic layer and a lesser magnetic field H1 to the first ferromagnetic layer so as to magnetize regions in the higher-anisotropy-field second ferromagnetic layer prior to magnetizing regions in the lower-anisotropy-field first ferromagnetic layer; and a read head for detecting the transitions between the magnetized regions of said ferromagnetically coupled first and second ferromagnetic layers.

* * * * *

UNITED STATES PATENT AND TRADEMARK OFFICE
CERTIFICATE OF CORRECTION

PATENT NO. : 7,550,210 B2
APPLICATION NO. : 11/372295
DATED : June 23, 2009
INVENTOR(S) : Andreas Klaus Berger et al.

Page 1 of 1

It is certified that error appears in the above-identified patent and that said Letters Patent is hereby corrected as shown below:

In column 10, line 20, delete the word "isotropy" and replace with the word "anisotropy".

In column 10, line 27, delete the words "higher-anisotropy-field".

In column 10, line 29, delete the words "lower-anisotropy-field".

Signed and Sealed this

Fourth Day of August, 2009

JOHN DOLL
*Acting Director of the United States Patent and Trademark Office*